United States Patent [19]

Taylor

[11] 3,899,009

[45] Aug. 12, 1975

[54] FUEL NOZZLE VAPOR RETURN ADAPTOR

[76] Inventor: John C. Taylor, 16 Cinnamon Ln., Portuguese Bend, Calif. 90274

[22] Filed: Feb. 1, 1973

[21] Appl. No.: 328,885

Related U.S. Application Data

[63] Continuation-in-part of Ser. No. 269,826, July 7, 1972, abandoned, which is a continuation-in-part of Ser. No. 256,534, May 24, 1972, abandoned.

[52] U.S. Cl. ............... 141/59; 141/DIG. 1; 141/97; 285/9 M
[51] Int. Cl. ............................................ B65b 31/06
[58] Field of Search ......... 141/59, 392, 52, 287, 41, 141/42, 307, 97, 310, 290, 390, 383–386, DIG. 1; 285/9 M

[56] References Cited
UNITED STATES PATENTS

| | | | |
|---|---|---|---|
| 3,016,928 | 1/1962 | Brandt | 141/59 |
| 3,566,928 | 3/1971 | Hansel | 141/392 |
| 3,581,782 | 6/1971 | Onufer | 141/59 |

Primary Examiner—Houston S. Bell, Jr.
Attorney, Agent, or Firm—Fulwider, Patton, Rieber, Lee & Utecht

[57] ABSTRACT

A fuel nozzle vapor return adaptor for use with a conventional fuel nozzle of the type including a spout receivable in the neck of a fuel tank and having an anchoring device thereon for anchoring such nozzle in the neck to adapt such nozzle for returning vapor from such fuel tank to a vapor collection area. The adaptor includes a boot telescoped over the spout and secured on its rear extremity to the nozzle. The boot is formed with an outlet which is connected with one end of a vapor return conduit leading to a fuel storage tank. Mounted on the free end of the boot is a releasable seal which is abuttable against the inlet to the fuel tank neck for sealing therewith. A vapor return valve is provided for permitting flow of vapor from the boot and through the vapor return conduit to the vapor collection area and for selectively preventing vapor escape from the collection area and through the conduit. Consequently, the boot may be mounted on a conventional fuel nozzle with the conduit being connected to a vapor storage area, and when a fuel tank is to be filled the sealing means may be abutted against the fuel tank neck opening and any vapor expelled from the fuel tank and out the neck during filling of the fuel tank will be directed through the vapor return conduit to the storage tank to thereby prevent escape to the atmosphere and consequent pollution.

In another embodiment a blower includes in the vapor return conduit creates a slight negative pressure in the vehicle fuel tank to prevent any vapor loss out of the fuel tank vent or from leakage at the fuel nozzle connection to the fuel tank inlet. A pressure control valve in a recycle conduit connecting the blower discharge and suction conduits maintains a preselected pressure in the inlet conduit to the blower.

On the output side of the blower, a float operated valve is provided in the vapor return conduit, at or near its connection to each fuel storage tank for selectively permitting the passage of vapors while preventing the passage of liquid.

10 Claims, 22 Drawing Figures

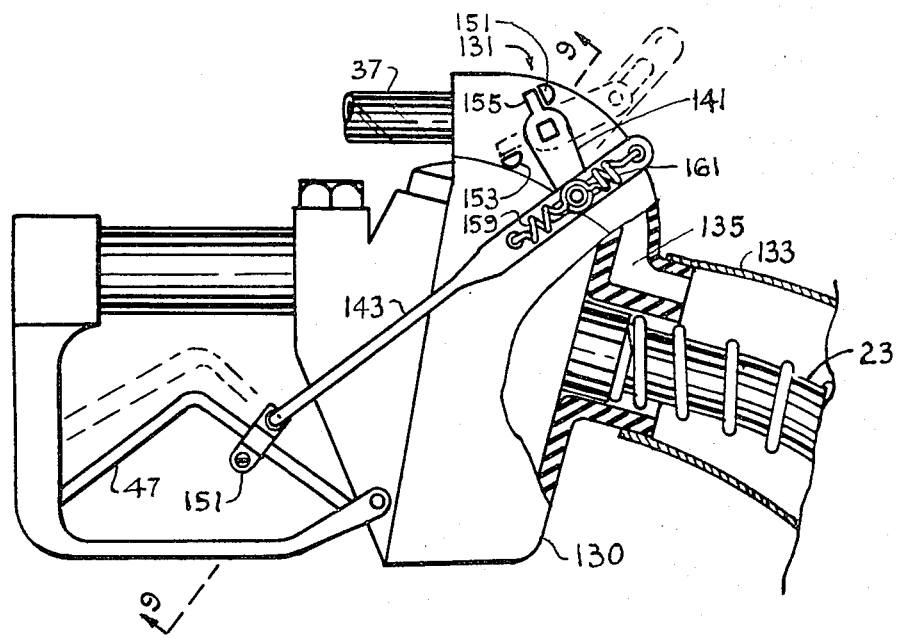
FIG. 8
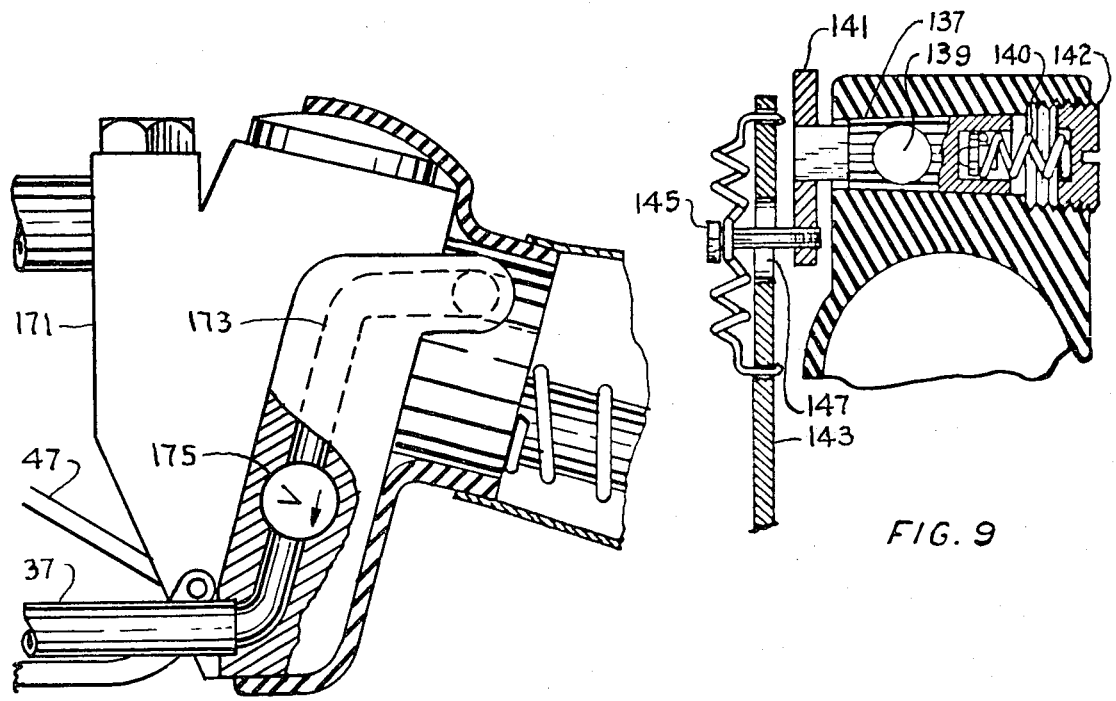
FIG. 9
FIG. 10

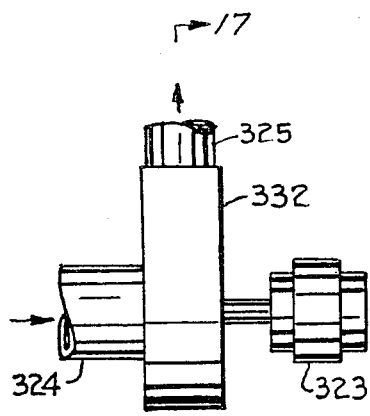
FIG. 16
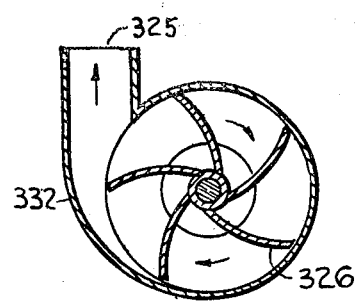
FIG. 17
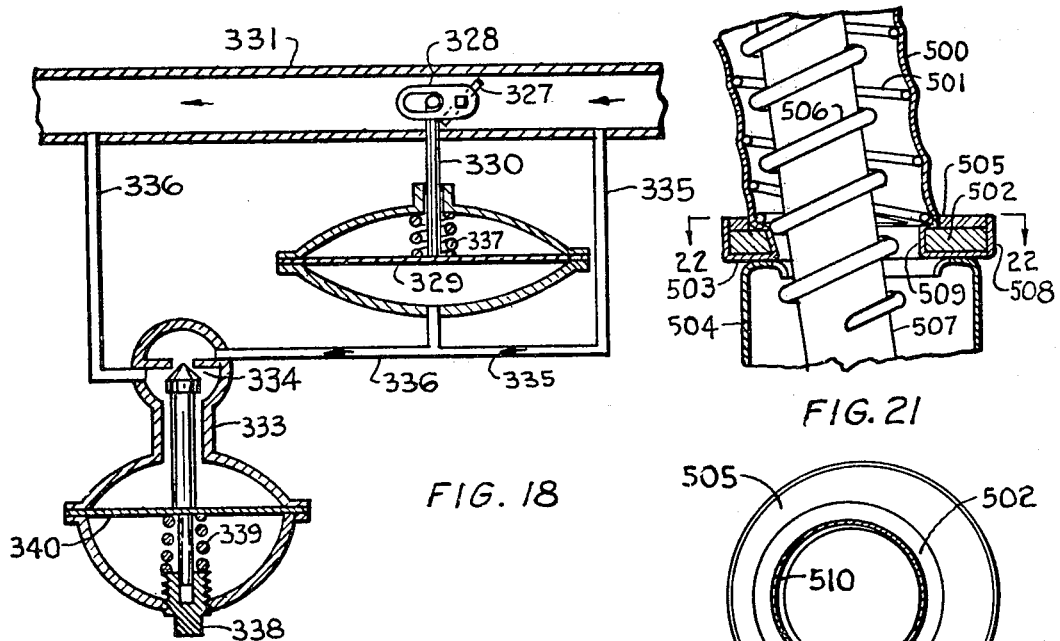
FIG. 18
FIG. 21
FIG. 22

FUEL NOZZLE VAPOR RETURN ADAPTOR

CROSS REFERENCE TO RELATED APPLICATIONS

This application is a continuation-in-part of U.S. Pat. application Ser. No. 269,826, filed July 7, 1972, which is a continuation-in-part of U.S. Pat. application Ser. No. 256,534, filed May 24, 1972, both now abandoned.

BACKGROUND OF THE INVENTION

1. Field of the Invention

The fuel nozzle vapor return adaptor of present invention relates to an apparatus for collecting vapors expelled from a fuel tank, such as an automobile gasoline tank, during filling thereof to prevent pollution of the atmosphere.

2. Description of the Prior Art

With the advent of anti-pollution legislation, it has become necessary to provide means for collecting vapors expelled from automobile gasoline tanks during filling thereof and for capturing spillage occurring during such filling. Since there are millions of gasoline pump fuel nozzles already installed on gasoline pumps throughout the country, it is totally impractical to discard all such nozzles and provide new customer-made nozzles that will perform in the manner required by such anti-pollution legislation. There are no satisfactory adaptors available for adapting such nozzles to collect vapors expelled thus necessitating delay in installation of appropriate pollution control devices and resulting in industry obtaining waivers further delaying the date on which anti-pollution legislation is to become effective.

Numerous vapor recovery devices have been proposed for collecting vapors from an automobile fuel tank during filling thereof, but most such devices either require custom-made fuel nozzles thus necessitating replacement of conventional fuel nozzles or result in interference with the anchoring springs normally surrounding the nozzle spouts for anchoring such nozzles in the fuel tank opening during filling so such nozzle may be left unattended. Additionally, many prior art vapor recovery devices of this type do not operate satisfactorily with various different size gasoline tank openings, thus preventing use with automobiles having different size openings.

SUMMARY OF THE INVENTION

The fuel nozzle vapor recovery adaptor of the present invention is characterized by a boot receivable over a nozzle spout and having one end thereof secured to the nozzle. Mounted on the free end of the boot is a releasable seal for abutting the opening to a neck leading to a fuel tank to be filled for blocking entry of such boot into the neck and for sealing with such opening. A vapor return conduit leads from the boot to a vapor collection area and a vapor control value is provided for permitting flow of vapor from such boot to the collection area but for selectively blocking flow from the collection area back to the boot.

The objects and advantages of the present invention will become apparent from a consideration of the following detailed description when taken in conjunction with the accompanying drawings.

DESCRIPTION OF THE DRAWINGS

FIG. 8 is a side view partially broken away, of a third embodiment of the fuel nozzle vapor recovery adaptor of present invention;

FIG. 9 is a sectional view taken along the line 9—9 of FIG. 8;

FIG. 10 is a side view, partially broken away, of a fourth embodiment of the fuel nozzle vapor recovery adaptor of present invention;

FIG. 16 is a side view of a blower assembly adapted for use in combination with the embodiment shown in FIG. 13;

FIG. 17 is a sectional view taken along the line 16–17 of FIG. 15;

FIG. 18 is a diagrammatic sectional view of a pressure control valve in a blower recycle conduit of FIG. 13;

FIG. 21 is a sectional view of yet another embodiment of the fuel nozzle vapor return adaptor of present invention; and FIG. 22 is a sectional view taken along the line 21—21 of FIG. 21.

DESCRIPTION OF THE PREFERRED EMBODIMENT

Figure 1:
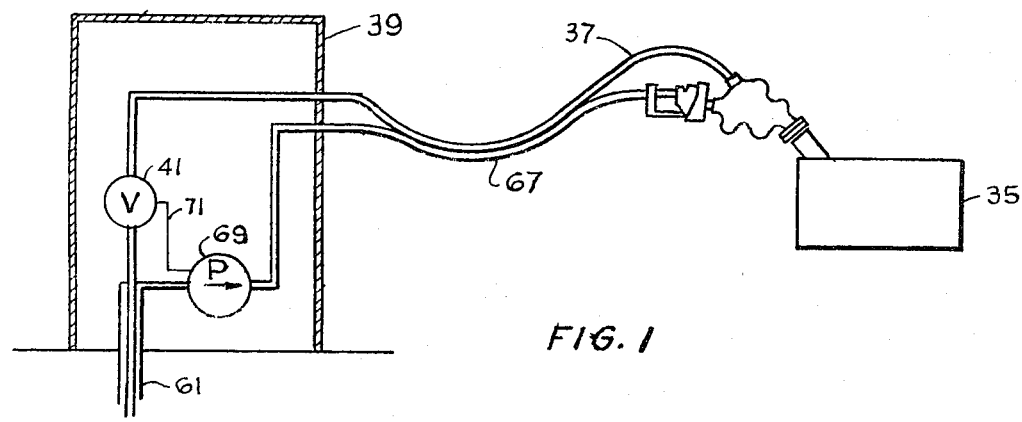
FIG. 1 is a diagrammatic view of a fuel nozzle having a vapor recovery adaptor embodying the present invention installed thereon.
Figure 2:
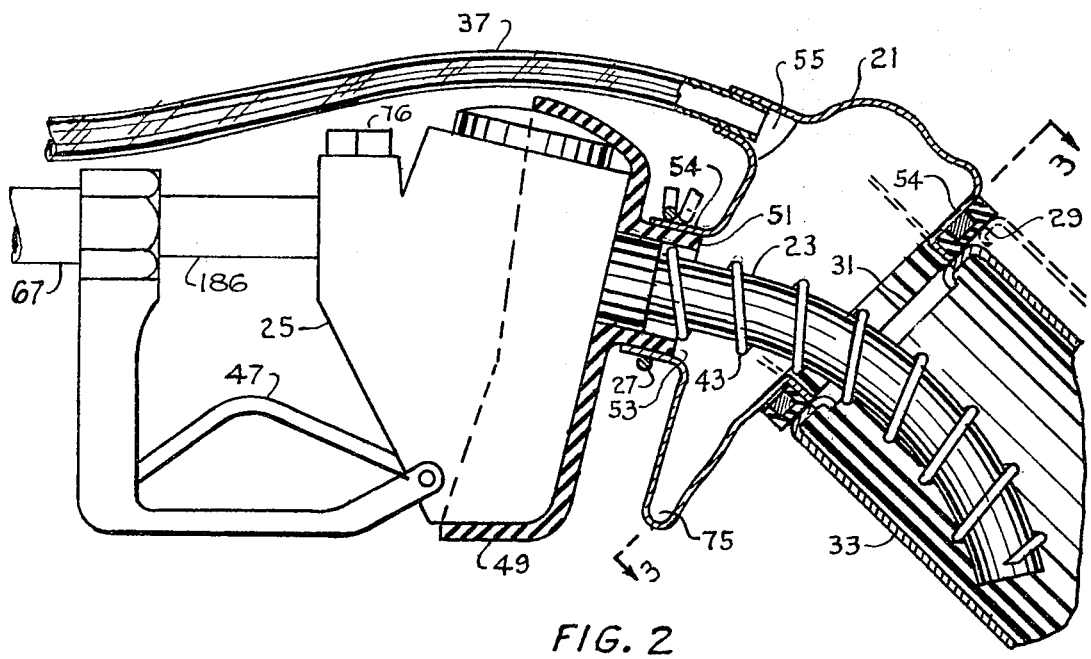
FIG. 2 is a sectional view, in enlarged scale, of the vapor recovery adaptor shown in FIG. 1.

Referring to FIGS. 1 and 2, the fuel nozzle vapor recovery adaptor of present invention includes, generally, a highly flexible bag or boot 21 which is loosely telescoped over the spout 23 of a conventional gasoline pump fuel nozzle 25. The boot 21 is secured on its rear extremity to the nozzle 25 by means of a clamp 27 and mounts a resilient vapor seal 29 on its free extremity for abutting against the rim of the inlet 31 to the neck 33 of an automobile gasoline tank 35 to be filled. A transparent vapor conduit 37 leads from the boot 21 to a gasoline pump housing or stand 39 for returning vapors to an underground fuel storage tank (not shown). The conduit 37 includes a solenoid operated vapor control valve 41 for controlling flow of vapors through such conduit. Thus, when an automobile fuel tank 35 is to be filled, the nozzle spout 23 may be inserted in the neck 33 and an anchoring spring 43 surrounding such spout may be engaged with the rim of the neck opening 31 to anchor the nozzle in position so the tank 35 may be automatically filled with the service station attendant turns his attention to other duties. During filling of the tank 35, the vapors expelled therefrom will be captured in the boot 21 and returned through the vapor return conduit 37 to the underground storage tank.

The fuel vapor recovery adaptor of the present invention may conveniently be installed on a fuel nozzle 25 of the type available from OPW Division of Dover Corporation and sold under the trade name FIL-O-MATIC. The nozzle 25 includes a valve controlled by a manual handle 47 and is normally covered on its front side by means of a resilient fender guard 49. The fender guard 49 is formed with a forwardly projecting boss 51 that surrounds the base of the spout 23 and the rear side of the boot 21 is formed with a necked down opening 53 conveniently received over such boss 51.

The boot 21 itself is preferably constructed of transparent plastic for convenient viewing therethrough and is of a diameter sufficiently greater than the diameter of the seal 29 to enable the walls thereof to spread radially outwardly over such seal to form an annular band 54 overlying such seal as depicted in solid lines in FIG. 2. The boot 21 includes a rearwardly projecting neck forming a vapor outlet 55 offset from the boss 51. The vapor outlet port 55 is connected with one end of the vapor conduit 37, such conduit leading to the pump housing 39 and projecting downwardly through a pipe 61 leading from the underground storage tank. The conduit 37 is transparent adjacent the nozzle 25 so the customer can observe that fluid fuel is not being returned to the storage tank.

Figure 3:
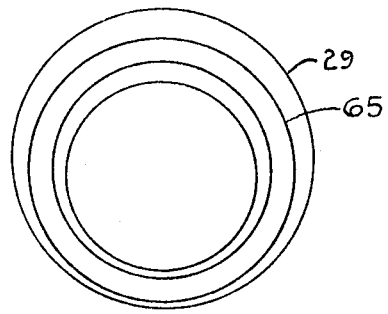
FIG. 3 is a transverse sectional view taken along the line 3—3 of FIG. 2.

The vapor seal 29 is in the form of an eccentric resilient rim 29 as shown in FIG. 3 to form an eccentric sealing surface that is substantially wider on the top side than on its bottom side. This feature enables the seal to mate properly with numerous different size neck inlets 31 while remaining relatively compact for convenient use in the relatively close quarters normally provided around the inlet to automobile gasoline tanks. Encased within the resilient seal 29 is a ring magnet 65 which is attracted to the neck 33 to urge the seal 29 firmly against the rim forming the inlet 31.

The nozzle 25 is conventionally connected with a fuel hose 67 leading from the pump housing 39 and such fuel hose is connected with an electric fuel pump 69 which draws fuel through the pipe 61 from the underground tank. The solenoid of the vapor control valve 41 is connected in electrical circuit with the pump 69 by means of a lead 71 to provide for opening of such valve when the pump 69 is operated.

In operation, the vapor recovery adaptor of present invention is purchased as a kit and the boot 21 may be conveniently installed by inserting the spout 23 through the opening 53 in the boot 21. The boot neck 54 is then fitted around the boss 51 of the fender guard 49. The boot 21 is secured in position by means of a ring clamp 27 which acts to form a vapor-tight seal between the neck 54 and boss 51. The vapor return conduit 37 is then connected with the vapor outlet 55 and the opposite end of such conduit is inserted through the pipe 61 to communicate with the interior of the underground fuel storage tank. The solenoid operated vapor control valve 41 is then connected with the electrical circuitry of the fuel pump 69 by means of the lead 71 and the system is then ready for operation.

When the fuel nozzle 25 is not in use it remains hung on a receptacle in the pump housing 39. When an automobile gasoline tank 35 is to be filled, the nozzle is grasped by the tube 186 defining the handle thereof and removed from the receptacle on the housing 39, the motor of the fuel pump 69 being energized thus energizing the vapor control valve 41 to open such valve.

The spout 23 is inserted in the inlet 31 to the neck 33 thus causing the vapor seal 29 to abut the rim of the opening 31 to seal therewith. Insertion of the spout 23 into the neck 33 collapses the boot 21 causing it to roll radially outwardly over the seal 29 to form the annular overlying band 54 and, also a downwardly hanging fold or bag 75. The attraction between the magnetic ring 65 and the ferromagnetic neck 33 provides for a positive seal to prevent escape of vapors. Since the boot 21 is blocked against entering the opening 31, the anchor spring 43 of the spout 23 may be engaged with the rim of the inlet 31 thus holding the nozzle 25 in position and enabling the operator to depress the valve control handle 47 and engage such handle with a retainer (not shown) operated by a pressure responsive controller, generally designated 76, it being realized that such pressure controllers are normally included in conventional nozzles 25.

As the gasoline tank 35 fills with gasoline, vapors in such gasoline tank will be displaced thus forcing such vapors therefrom and out the neck 33 to be captured in the boot 21 and directed through the vapor return conduit 37 to the underground storage tank thus preventing escape to the atmosphere and consequent pollution. Any positive pressure developed in the boot 21 will act on the annular band 54 thus creating an overall pressure differential across the seal 29 urging such seal into even more positive engagement with the neck 33. Additionally, any liquid gasoline splashing from the neck 33 will be collected in the fold 75 of the boot 21 for return to the gas tank 35 before the boot 21 is detached from the neck 33.

When the tank 35 is completely filled, the gasoline will back up the neck 33 and contact the end of the spout 23 thus creating a back pressure therein to actuate the pressure controller 76 thus releasing the handle retainer (not shown) retaining the handle 47 in the valve open position to thus release the nozzle valve and discontinue gasoline flow therethrough.

In normal situations, the service station attendant will have completed his other duties relating to the washing of windows and checking of oil and will be ready to remove the nozzle 25 for replacement on the pump stand 39. As the nozzle 25 is removed from the neck 33, the boot 22 will be stretched along an upwardly inclined axis to cause any liquid gasoline that has collected in the downwardly hanging fold 75 to run downwardly into the neck 33 thus preventing the spillage thereof. It will be appreciated that the transparency of the boot 21 enables the attendant to view the fuel therein to determine if all the liquid has drained therefrom before he disengages the seal 29.

As the nozzle 25 is removed from the neck 33, the wall of the boot 21 will be pulled axially upwardly with respect to the neck 33 thus causing the annular band 54 to unroll off the seal 29 and assume the axial direction depicted in broken lines in FIG. 2 thus relieving the pressure from the top side of the seal 29 and reducing the force holding such seal in sealing engagement with the neck 33 to enable the attendant to conveniently disengage such seal from such neck so the gasoline tank cap may be secured thereto. The nozzle 25 is then returned to the gasoline pump stand 39 and the motor of the pump 69 de-energized to de-energize the solenoid of the vapor return control valve 41 thus preventing escape of vapors from the underground tank and through such valve 41.

It will be appreciated that the flat configuration of the sealing side of the seal 29 which abuts against the rim of the inlet 31 enables such seal to be engaged with numerous necks 33 of varied diameters for effective sealing therewith thus enabling the boot 21 to accommodate many different automobiles having gasoline tanks including different diameter necks 33. Further, the eccentricity of the seal 29 as depicted in FIG. 3 enables the lower left hand side of such seal, as viewed in FIG. 2, to be engaged with the lower side of the rim defining the opening 31 and the upper right hand side of such seal to accommodate the necks 33 of a great variety of diameters ranging from a diameter smaller than that shown in solid lines in FIG. 2 to a diameter larger than that shown in broken lines in FIG. 2.

Figure 4:
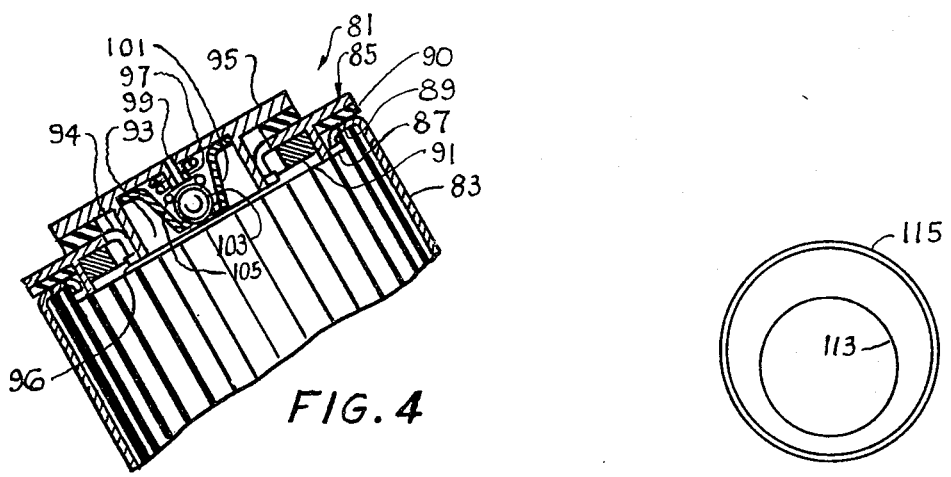
FIG. 4 is a detail sectional view of a reducer which may be utilized with the fuel nozzle vapor recovery adaptor shown in FIG. 1.
Figure 5:
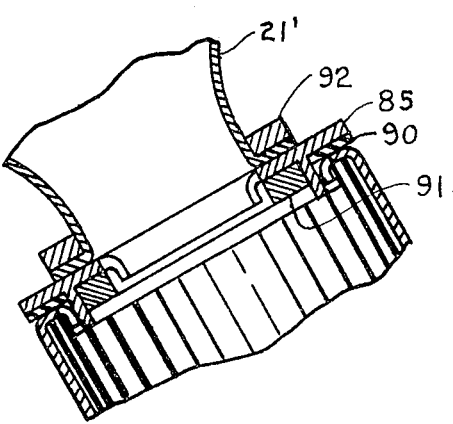
FIG. 5 is a sectional view similar to FIG. 4 and showing the reducer mated with a modification of the fuel nozzle vapor recovery adaptor shown in FIG. 1.

Referring to FIGS. 4 and 5, a reducer, generally designated 81, is provided for use in combination with the nozzle 25 and boot similar to that shown in FIG. 2 and it is particularly convenient for connection with a large diameter fuel tank neck 83, such as that for a truck, to adapt such neck for connection with a boot of the type shown in FIG. 2. The reducer device 81 includes a reducer ring 85 having outer coupling lugs 87 on the underside thereof for coupling to the coupling flange 89 normally included in the neck 83 of a vehicle fuel tank and including a resilient seal 90. Mounted on the underside of the reducer ring 85 is a magnetic ring 91 for attracting a ferromagnetic ring 92 included in a boot 21' (FIG. 5). The adapter ring 85 forms a central aperture 93 which is surrounded by a coupling flange 94 that cooperates with coupling lugs 96 included in a reducer cap, generally designated 95, which covers such aperture 93. The cap 95 is formed centrally with an inwardly projecting boss 97 that defines a through vent hole 99. Mounted centrally beneath the vent opening for the hole 99 is a hollow frustrum shaped holder 101 which holds a sealing ball 103 in engageable alignment with the lower end of such hole 99, such ball being biased slightly away from such hole 99 by means of a biasing spring 105. Thus, air may be admitted through the hole 99 and into the gasoline tank as such gasoline is consumed but when fuel splashes upwardly in the neck 83, the ball 103 will be carried against the lower end of the boss 97 to seat thereagainst thus acting as an anti-surge valve and preventing spillage of liquid fuel out the vent hole 99.

Thus, the adaptor ring 85 may be conveniently coupled to the inlet to a large diameter fuel tank neck 83 and when it is desirable to fill the tank, the cap 95 may be removed and the nozzle spout inserted in the neck 83 in a manner similar to that shown in FIG. 2 with the magnetic ring 91 acting to attract the ferromagnetic ring 92 against the reducer ring thus forming a tight seal against escape of vapors.

Figure 6:
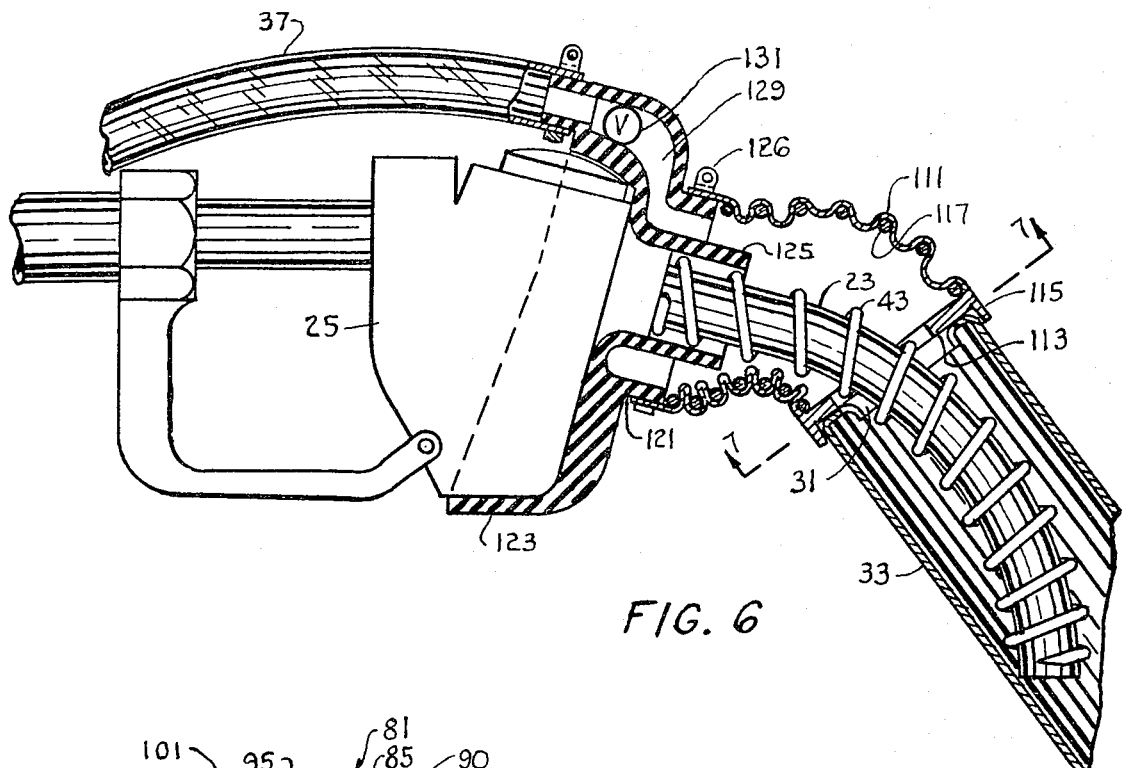
FIG. 6 is a sectional view depicting a second embodiment of the fuel nozzle vapor recovery adaptor of present invention.
Figure 7:
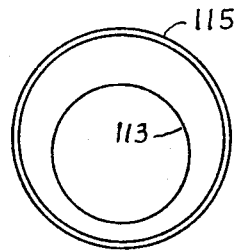
FIG. 7 is a transverse sectional view taken along the line 7—7 of FIG. 6.

The fuel nozzle vapor recovery adaptor shown in FIG. 6 is substantially similar to that shown in FIG. 2 except that such adaptor includes a boot, generally designated 111, having an eccentrically shaped annular abutment seal 113 on the free end thereof, which seal includes an axially projecting peripheral flange 115 (FIG. 7) surrounding the periphery thereof. The boot 111 includes a relatively light coil compression spring 117 which serves to urge the abutment seal 113 into firm abutting engagement with the fuel tank neck 83.

The boot 111 is attached on its rear extremity to an annular neck 121 formed in a fender guard, generally designated 123, such neck surrounding a boss 125 formed in such fender guard for receipt of the base of the spout 23 and being held in position by a removable clamp 126.

Still referring to FIG. 6, leading rearwardly from the top side of the boss 125 is a vapor outlet port 129 which has a splash valve 131 mounted therein, such splash valve being similar to the spring biased ball 103 shown in FIG. 4 for preventing liquid from splashing into the vapor return conduit 37.

In operation, the fuel nozzle vapor recovery adaptor shown in FIG. 6 performs substantially the same as the adaptor shown in FIG. 2 except that when the nozzle spout 23 is initially inserted in the opening 31 of the fuel tank neck 33, the seal 113 is aligned over the rim of the opening 31 with the axial flange 115 extending downwardly over a portion of such neck to maintain such seal aligned over the rim and firmly sealing therewith. As the spout 23 is inserted further into the neck 33, the coil spring 117 collapses with relatively little resistance to permit such insertion but maintains a positive force on the seal 113 to maintain it abutted against the rim forming the opening 31 to maintain sealing relationship therewith. It is again observed that the boot 111 itself does not enter the neck 33 thus enabling the anchoring spring 43 to be engaged against the rim of the opening 31 to hold the nozzle 25 in place while fillng of the gasoline tank is completed.

During filling of the gasoline tank, vapors expelled therefrom will be directed through the boot 111 and into the vapor return conduit 37, it being appreciated that the splash valve 131 enables the free flow of such vapors. However, any fuel splashing from the neck 33 will be caught in the boot 111 and will be directed back to the neck 33, it being noted that the splash valve 131 will prevent splashing of such liquid upwardly into the conduit 37.

The fuel nozzle vapor recovery adaptor shown in FIG. 8 is similar to that shown in FIG. 2 except that it includes a fender guard, generally designated 130, which has a vapor control valve, generally designated 131, mounted in the upper portion thereof for controlling vapro flow from the vapor recovery boot 133 and the vapor return conduit 37.

Referring to FIGS. 8 and 9, the fender guard 130 is formed with a vapor flow passage 135 leading around its upper contour and having a rotary valve core 137 which includes a through diametrical flow bore 139 alignable with the vapor flow passage 135 for permitting vapor flow therethrough, such core being held in position by means of a mounting spring 140 and threaded insert 142. Still referring to FIG. 9, the left hand end of the valve core 137 is formed with a radially diametrically projecting control arm, generally designated 141, and pivotally and slidably connected on its free extremity with a control link 143 by means of a slider stud 145 received slideably in a longitudinal slot 147. Referring to FIG. 8, the link 143 projects downwardly and rearwardly to connect on its lower extremity with the fuel valve control handle 47 by means of a mounting clip 151.

Referring to FIG. 8, the fender guard 130 is formed with respective valve-closed and valve-open stops 151 and 153 projecting from the side thereof adjacent the valve lever arm 141. The lever arm 141 is formed with a radially projecting stop tab 155 which is received intermediate the stops 151 and 153 and controls the degree of travel of the valve core 137.

Referring to FIG. 8, the lower extremity of the valve core lever arm 141 is connected between a pair of oppositely extending coil tension springs 159 and 161 which are connected on their opposite extemities to the link 143.

Thus, in operation, when the fuel valve control handle 147 is in its solid line valve-closed position, the control link 143 will be in a solid line position thus causing the coil spring 159 to draw the lower end of the lever arm 141 downwardly thus tending to rotate the valve core 137 clockwise and directing the flow-bore 139 (FIG. 9) perpendicular to the flow path 135 thus blocking flow of vapors from the vapor return conduit to prevent escape of vapors from the underground storage tank to the atmosphere.

When the spout 23 is inserted in the neck 33 of a gasoline tank, and the valve control handle 47 raised to its broken line position, the control link 143 will be raised to its broken line position shown in FIG. 8 thus rotating the valve control lever 141 counterclockwise to its broken line position to align the flow-bore 139 (FIG. 9) with the flow passage 135 to permit flow of vapors therethrough. It will be realized that as the fuel valve control handle 47 is raised, the tension on the travel variance closure spring 159 will be relieved and tension will be applied to the opening spring 161 thus rotating the valve control lever 141 counter-clockwise, as viewed in FIG. 8, to the degree allowed by the stop 153 to assure exact alignment of the flow bore 139 with the vapor passage 135. The resiliency of such travel variance opening spring 161 will permit further travel of the control link 143 to enable the fuel valve control handle 47 to be moved beyond the vapor control valve-open position and to its full open position. As fuel fills the fuel tank, vapors expelled therefrom will be directed through the boot 133 and vapor return passage 135 to the vapor return conduit 37 thus preventing escape to the atmosphere.

The fuel nozzle vapor recovery adaptor shown in FIG. 10 is a modification of the adapter shown in FIG. 8 and is essentially the same except that it includes a nozzle, generally designated 171, which is formed with a vapor return passage 179 leading rearwardly therein for connection with the vapor return conduit 37. The vapor return passage 173 includes an integral vapor control valve 175 which is operatively connected with the fuel valve control handle 47 for opening thereof when such handle is moved to the valve-open position.

Figure 11:
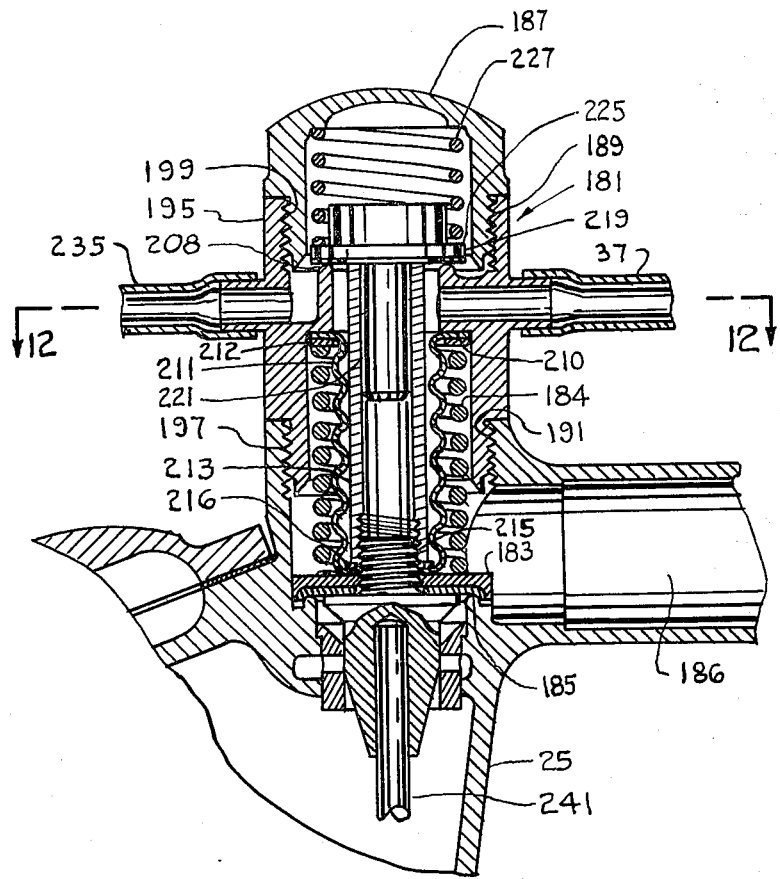
FIG. 11 is a sectional view of a fifth embodiment of the fuel nozzle vapor recovery adaptor of present invention.

The fuel nozzle vapor recovery adaptor shown in FIG. 11 is substantially the same as that shown in FIG. 10 except that the vapor control valve, generally designated 181, is mounted within a modified nozzle 25, it being appreciated that the nozzle 25 conventionally includes a fuel valve having a poppet 183 which seats on an annular seat 185 to block flow from the tube 186 of the nozzle 25 and is urged downwardly to its sealing position by means of a coil spring 184 which conventionally has its top end abutted against the interior of a bonnet 187. The bonnet 187 includes a reduced-in-diameter portion which is threaded at 189 for receipt in an access bore which is formed with interior threads 191.

It has been found particularly convenient to merely unscrew the bonnet 187 from the threaded port 191 and to interpose a cylindrical vapor valve body, generally designated 195, which is formed on its lower extremity with a reduced-in-diameter portion having external threads 197 formed thereon for engagement with the threads 191 in the nozzle housing and having its upper portion formed with internal threads 199 for receipt of the threaded portion 189 of the bonnet 187.

Figure 12:
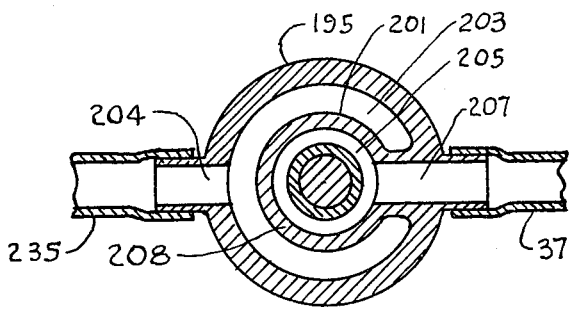
FIG. 12 is a transverse sectional view taken along the line 12—12 of FIG. 11.

Referring to FIG. 12, the valve body 195 is formed in its upper portion with an interior annular wall 201 which cooperates with the exterior wall of such valve body to form an inlet annulus 203 having an inlet port 204. The interior annular wall 201 forms an interior vapor outlet chamber 205 which communicates with an outlet port 207 connected with the vapor return conduit 37, the top of such wall defining a vapor valve seat 208. Referring to FIG. 11, the valve body 195 is formed intermediately with an annular downwardly facing shoulder 210 abutted by the top end of the spring 184. Telescoped within the fuel valve spring 184 is a neoprene bellows assembly 211 which is flared outwardly at its top end and has a washer 212 inserted between the top end of the spring 184 and such flare. Telescoped downwardly within the bellows 211 is a vapor valve push tube 213 which is internally threaded on its lower end for screwing onto a stud 215 projecting upwardly from the poppet 183. A vapor valve poppet 219 is carried by the upper end of the push tube 123 and includes a downwardly projecting guide stem 221 received within the upper end of such tube, shims 216 of the necessary thickness being provided at the bottom end of such tube for adjusting the distance between the fuel poppet 183 and vapor poppet 219 to assure that such vapor poppet is in its closed position when the fuel poppet is in its closed position. The poppet 219 is formed on its bottom side with a peripheral flange 225 which has the lower end of a vapor valve spring 227 abutted thereagainst, the upper end of such spring being abutted against the valve bonnet 187.

In operation, the fuel nozzle vapor recovery adaptor shown in FIG. 11 is installed by removing the bonnet 187 from the body of the nozzle 25 and unscrewing and discarding a jam nut (not shown) from the fuel valve poppet stud 215 and then inserting the bellows 211 downwardly within the valve spring 187, the bellows washer 212 being in position under the upper bellows flange.

The vapor valve body 195 is then screwed into position with the shoulder 210 abutting against the upper bellows flange to compress the fuel valve spring 187 downwardly against the fuel valve poppet 183. The vapor valve poppet 219 is then placed in position with the guide shaft 221 received in the push tube 213 and the vapor valve spring 227 positioned over such vapor valve poppet 219 and the valve bonnet 187 screwed into position. Thereafter, a vapor inlet tube 235 may be connected between the boot 21 and the inlet port 204 and the vapor return conduit 37 connected with the outlet port 207.

When a fuel tank is to be filled, the fuel valve control handle 47 is depressed to urge the drive rod 241 (FIG. 11) upwardly against the fuel valve poppet 183 to raise such poppet off its seat 185 to enable fuel flow from the nozzle tube 186. Raising of the poppet 183 also raises the push rod 213 to raise the vapor poppet 219 off its seat 208 to provide for communication between the vapor inlet chamber 203 (FIG. 12) and the vapor outlet chamber 205 to permit vapor flow from the boot 21, through conduit 235 and to the vapor return conduit 37. It will be appreciated that the vapor flowing in the inlet port 204 and over the vapor seat 208 into the annulus 205 will be maintained separated from the fuel by means of the bellows 211.

When filling of the fuel tank has been completed, the fuel valve control handle will be released thus releasing the drive rod 241 for return to its neutral position shown in FIG. 11 thus permitting the fuel poppet 183 to return to its seat 185 under the influence of the fuel valve spring 184. Concurrently, the vapor valve return spring 227 will return the vapor poppet 219 to its seat 208 thus preventing escape of vapor from the vapor return conduit 37 when the nozzle 25 is returned to the pump stand 39 (FIG. 1).

Figure 13:
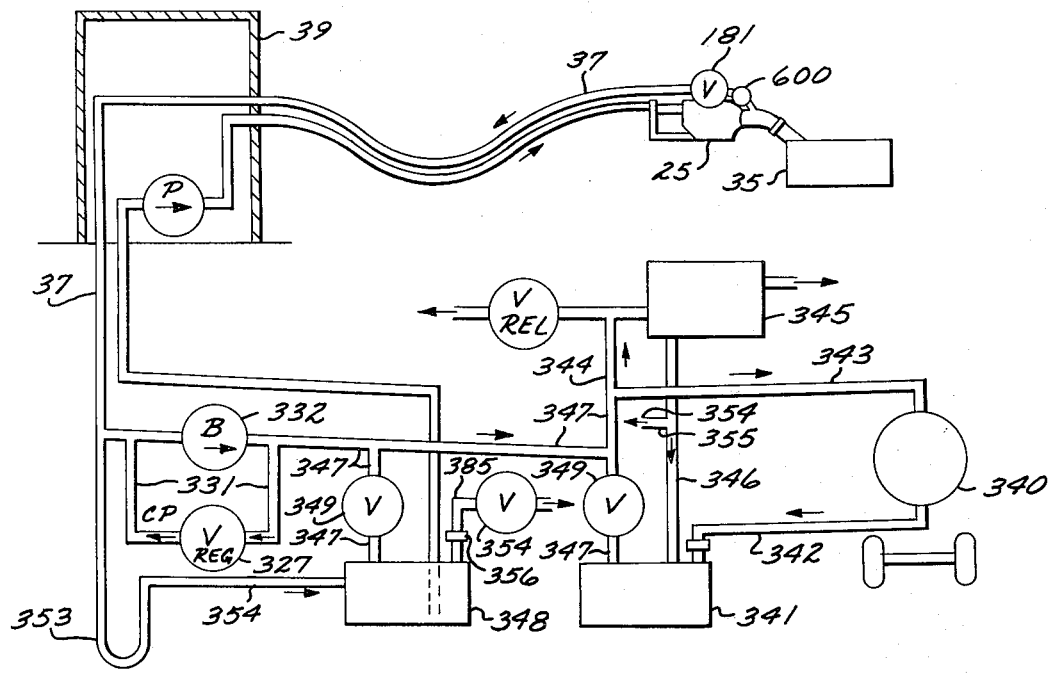
FIG. 13 is a diagrammatic view of yet another embodiment of a service station vapor recovery system constructed according to the present invention.

As shown in FIG. 13, yet another embodiment of the present invention includes a continuously operating blower 332 connected at the inlet thereof to the vapor conduit 37 controlled to maintain a constant predetermined negative pressure in the vapor conduit 37 by a recycle conduit 331 containing a control valve 327 connected in shunt thereacross in a manner permitting vapors to recycle from the discharge side to the suction side of said blower 332. The conduit 37 further contains a vacuum regulator 600, of a type commercially available such as Conoflo H20VT regulator manufactured by the Conoflo Corporation, Blackwood, New Jersey, 08012.The vacuum regulator 600 is set to maintain a slight vacuum at the inlet of the vapor conduit 37 and being located near said vapor conduit inlet unaffected by varying friction loss of pressure at different flow rates in said vapor conduit 37. Valve 327 and vacuum regulator 600 control the pressure in vapor conduit 37 and may be set according to means further described to produce a partial vacuum or negative pressure in the vehicle fuel tank 35 when the fuel nozzle vapor return adaptor 25 is connected thereto and vapor valve 181 is open. This slight vacuum in the vehicle fuel tank 35 is sufficient to prevent hydrocarbon vapors from escaping via any open vent in the vehicle fuel tank 35 or through any leak in the connection of fuel nozzle vapor return adaptor 25.

During fuel delivery the liquid from a fuel transport truck tank 340 is conducted to flow to the fuel supply tank via a conduit 342 and the vapors displaced from said supply tank by the entering liquid flow to said truck tank 340 via vapor conduit 343 where excess vapors flow via a vapor conduit 344 to a vapor recovery system 345 to be compressed, refrigerated and condensed to liquid fuel which is returned to supply tank 341 via conduit 346. Such vapor recovery system 345 may be an "Intermark" vapor recovery system, commercially available from Atlantic Engineering Co., 2275 West Lincoln Avenue, Anaheim, California, or any other suitable system. Concurrent with fuel delivery the flow of vapor in conduit 344 may be augmented by vapors collected from fueling vehicles, such vapors being discharged by blower 332 into the vapor conduit 347 which interconnects the fuel supply tanks 341 and 348 and conduit 344. A further inportant function of blower 332 is to prevent a pressure increase in the vapor conduit 347 from being transmitted to a vehicle fuel tank via conduit 37 and to concurrently provide for the flow of vapors from the predetermined low pressure region in conduit 37 to the higher pressure region in conduit 347 to be alternatively stored either in storage tank 348 or supply tank 341, or to enter the vapor recovery system 345. The vapor condensate associated with the pumping of vapors is collected and transferred across blower 332 from the negative pressure region of the vapor return conduit 37 by gravity through a liquid-filled pressure seal 353, generally shaped as a manometer, into a liquid drain line 354, which is in the region of positive pressure, thence into the fuel supply tank 348, or alternatively into the recovered liquid line 346 at the connection 335.

Figure 20:
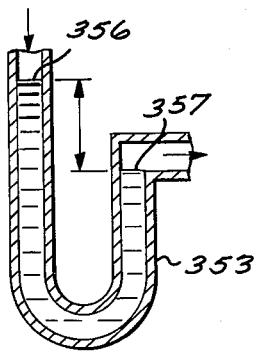
FIG. 20 is a sectional view of a liquid seal constructed according to the present invention.

As shown in more detail in FIG. 20, the differential liquid head H formed in the liquid seal 353 is that required to balance the pressure difference between the negative vapor pressure on the liquid surface at 356 and the positive vapor pressure on the liquid surface at 357. Thus condensation from the negative pressure region can enter the liquid pressure seal 353 and flow freely through it to exit at 357 while maintaining the pressure difference between regions of negative and positive pressure.

A valve 354 in the vent connection 385 which is attached to the filling tube cap 356 of fuel tank 348 provides a means of venting and depressuring said tank 348 prior to removal of said filling tube cap 356 for the purpose of gaging said tank by inserting a measuring rod through said fill tube, or for connecting a filling hose thereto.

As shown in FIG. 13, liquid flowing from tank 341 to tank 348, or vice versa, is prevented by float operated valves 349 located in the vapor conduit 347 near its connection with each of said tanks.

Alternatively, liquid flow up from tank 341 to tank 348, or vice versa, or to vapor recovery system 345, is prevented by locating a portion of conduit 347 at an elevation higher than te top of the fuel transport truck tank 340.

Figure 19:
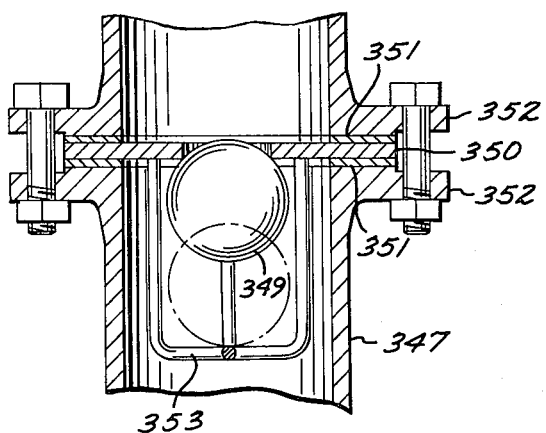
FIG. 19 is a sectional view of a float operated valve in the vapor conduit, which is a feature of the present invention.

As shown in more detail in FIG. 19, the ball float valve 349 is positioned in the vapor conduit 347 with a valve seat 350 clamped between gaskets 351 and pipe flanges 352. Rods 353 guide the ball float 349 to position it against an opening in the seat 350 when liquid rising in conduit 347 causes said float 349 to rise. When no liquid is present, the ball float 349 falls to the bottom of the cage formed by rods 353 and vapors pass freely around the ball float 347 and through the opening in the valve seat 350.

Figure 14:
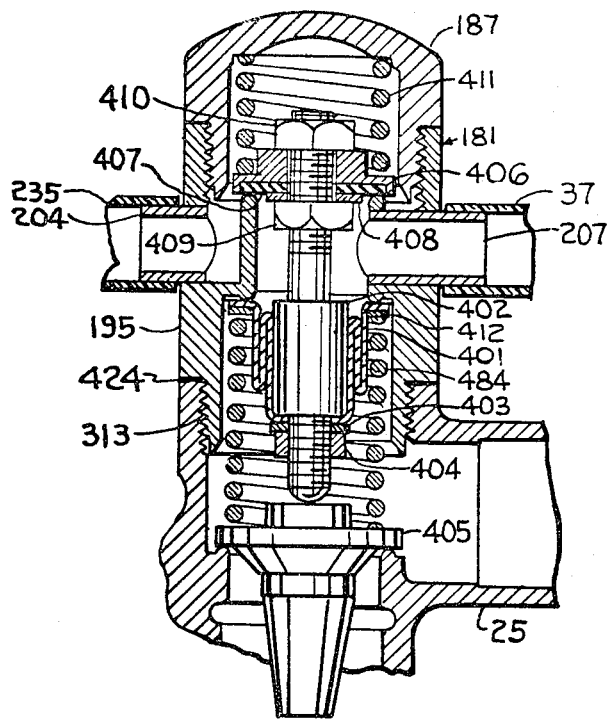
FIG. 14 is a sectional view of yet another embodiment of a vapor control valve constructed according to the present invention.

Shown in the combination with the system embodied in FIG. 13 is a vapor control valve generally designated 181. A further detailed embodiment thereof illustrated in FIG. 14 shows a control valve of this kind the use thereof not being limited to the embodiment of FIG. 13. Specifically in this illustration valve 181 includes a flexible sleeve 401 which is flared outwardly at its top, being compressed by a washer 412 inserted between the top end of a spring 484 and the flare. Sleeve 401 forms concentric overlapping folds to provide for vertical movement of a valve stem 402, which is attached to an inwardly flared bottom end of sleeve 401 by a washer 403 and nut 404. The shaft of valve stem 402 is enlarged to conform with the inner surfaces of sleeve 401, thereby supporting it against forces due to differences in pressure on the liquid and vapor sides of sleeve 401. A vapor valve poppet 406 is connected to the upper end of valve stem 402 and includes a resilient seal 407, washer 408, and nuts 409 and 410. A spring 411 presses against the upper surface of poppet 406 and holds the bottom end of valve stem 402 against the top surface of fuel poppet 405 such that poppet 406 will open concurrently with poppet 405. The threaded attachment of nuts 409 and 410 to valve stem 402 provide for adjusting the distance between the fuel poppet 405 and vapor poppet 406 to assure that such vapor poppet is in its closed position when the fuel poppet is in its closed position to prevent fuel vapors from escaping until fueling is commenced.

The fuel nozzle vapor return adaptor shown in detail in FIG. 14 is installed by removing the bonnet 187 from the body of the nozzle 25 and inserting the valve stem 402 within the spring 484, the sleeve 401, washer 412, washer 403 and nut 404 being assembled therewith. The vapor valve body 195 is then screwed into position using a sealing shim 424 of thickness suitable to correctly position the vapor inlet of the vapor valve body. The vapor valve poppet 406 is then assembled to the valve stem 402, seal 407, washer 408, nuts 409 and 410. Spring 411 is then positioned over the vapor valve poppet 406 and the valve bonnet 187 screwed into position. Thereafter, the vapor inlet tube 235 and the vapor return conduit 37 may be connected to the vapor valve body 195.

Figure 15:
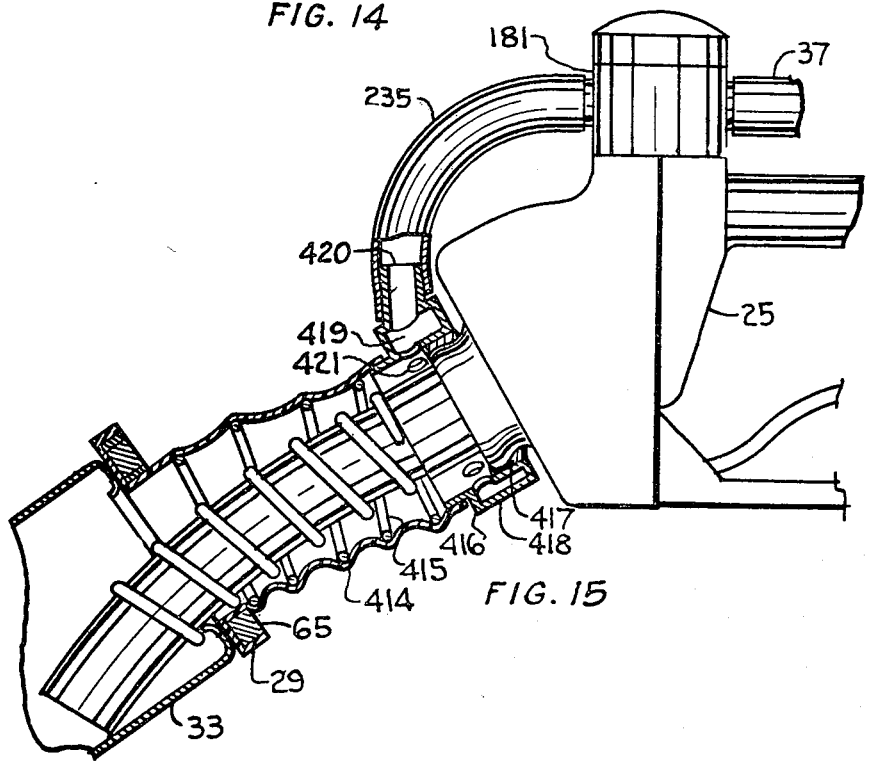
FIG. 15 is a sectional view of yet another embodiment of the fuel nozzle vapor return adaptor of the present invention.

Referring to FIG. 15 another embodiment of the nozzle adaptor further includes a flexible sleeve boot 414 supported against collapse by a helical coil spring 415 installed on the inside thereof. The spring 415 also serves to assist the ring magnet 65 in urging the relitient seal 29 against the annular inlet of the vehicle fuel tank nozzle 33. A connector 416 provides for attaching the boot 414 to the valve 25 and to the vapor conduit 235 which is also connected to the inlet of vapor valve 181. Connector 416 includes a cylindrical inner shell 417 and an outer shell 418 eccentrically spaced to form a vapor flow path 419 leading to outlet port 420. A number of inlet ports 421 connect said vapor flow path 419 with the interior of shell 417 which is connected to the flexible boot 414. Thus, connector 416 provides for unrestricted vapor flow with a minimum utilization of space.

Referring to FIGS. 16 and 17, blower 332 is driven by a motor 323 creating a vapor flow from inlet 324 across said blower to an outlet 325. Blower 332 comprises a conventional centrifical compressor wherein vapors entering the blower near the center of the rotating vanes 326 are driven outward by centrifugal force and expelled via outlet 325. A pressure difference is thereby created between the inlet 324 and outlet 325 of said blower 332.

As shown in FIG. 18 blower 332 has connected across the inlet and outlet connection thereof a pressure regulating system generally designated 500. System 500 includes a recirculation conduit 331 arranged to conduct vapors from the discharge to the suction of blower 332 where the flow rate of vapor in conduit 331 is controlled by a rotatable disc control valve 327 which is positioned by a crank 328 in response to the deflections of a flexible diaphragm 329 by a connecting rod 330, thereby throttling the vapor flow through the said valve 327 to maintain a desired pressure differential thereacross. Thus, if said downstream pressure varies from the desired set point, the flexible diaphragm 340 in pilot valve 333 is deflected, said diaphragm being positioned by the interaction of said downstream pressure with spring 339. The deflection of diaphragm 340 adjusts the opening 334 in pilot valve 333, thereby changing the vapor flow rate therethrough. The adjustment in the vapor flowrate through pilot valve 333 produces a change in pressure on diaphragm 329 because said pressure is a function of the vapor flowrates in the upstream pressure conduit 335 and the downstream pressure conduit 336. The said change in pressure on diaphragm 329 adjusts connecting rod 330 and the disc control valve 327. From the foregoing, it is apparent that the control valve 327 is constantly adjusted to maintain a constant downstream pressure. Adjusting screw 338 controls the pressure of spring 339 on diaphragm 340 in pilot valve 333 and thereby controls the set point of the pressure in the downstream vapor conduit 331.

Referring to FIG. 21, the nozzle adaptor shown in detail includes the flexible sleeve boot 500, supported against collapse by the helical coil spring 501 installed on the inside thereof. The spring 501 also serves to assist the ceramic magnet 502 in urging the resilient seal 503 against the annular inlet of the vehicle fuel tank nozzle 504. The field of the ceramic magnet is strengthened by the ferromagnetic ring 505 cemented thereto. The eccentric opening in the ferromagnetic ring 505 is slightly larger than the eccentric opening in the ceramic magnet 502 to provide space for abutting the end coil of helical coil spring 501 thereagainst. The eccentric opening in the ceramic magnet 502 is tapered on one side to form a larger opening on the face opposite the annular sealing surface to provide clearance for the anchor spring 506 which is wound on the spout 507 of the hose nozzle valve. The resilient seal 503 with outer flange 508 and inner flange 509 surrounds and is cemented to the ceramic magnet 502 to afford protection against breakage of the brittle ceramic material.

FIG. 22 shows the tapered surface 510 in the eccentric opening in the ceramic magnet 502 and the larger eccentric opening in the ferromagnetic ring 505.

In operation the vapors generated during a fueling operation, or the tank ullage vapors, displaced by the newly added fuel, are returned through valve 181 to the vapor return conduit 37. Valve 181 comprises a vapor return poppet valve 406 which is urged open by the opening motion of the fuel valve poppet 405. Poppet 406 is arranged to open and close concurrently with poppet 405. Thus a path for vapors is provided between the inside of boot 414 and the return conduit 37 concurrent with the inflow of fuel. A pressure recirculating conduit is connected across blower 332, maintaining at the input thereof a predetermined negative pressure. This recirculating line includes a disc valve, or damper, 327 disposed across a parallel feedback conduit 331 which is connected around blower 332, whereby blower output gases are recirculated back to the input as required to maintain the preselected negative pressure. Specifically the amount of recirculating is determined by the position of damper 327 which is connected to a diaphragm 329 responsive the opening formed by diaphragm valve 333. The output of blower 332 is connected by conduit 347 to the ullage of holding tank 348 and 341. Aslo connected in shunt with blower 332 is a liquid seal 353 which permits the transfer of vapor condensate to the holding tank 348 while maintaining a pressure differential thereacross during blower operations. In this manner the fuel vapors are evacuated from the tank during fueling and are returned to the holding tank. The condensate is collected in a liquid seal also to return to the holding tank while permitting a pressure differential across the blower.

From the foregoing, it will be apparent that the fuel nozzle vapor return adaptor of present invention provides a highly convenient and economical means for adapting existing fuel nozzles for compliance with pollution legislation which requires recovery of vapor displaced from gasoline tanks during filling thereof. The adaptor is easily installed on existing nozzles and mates with nearly all existing automobile tank necks without individual adjustment before each filling.

Leakage of vapors from open vents in vehicle fuel tanks is prevented.

During fueling operations utilizing the fuel nozzle vapor return adaptor of present invention, creation of pressure in vehicle fuel tanks is prevented, thereby precluding the possibility of pressuring liquid fuel into the vehicle carburator during such fueling operations.

Overfilling fuel supply tanks, with consequent intermingling and degradation of fuel, is prevented by the use of float operated valves in combination with the interconnected vapor conduits, a feature of this invention.

Positive closure of the vapor valve after each vehicle is fueled prevents vapor emission between vehicle fuelings, which is a feature of this invention.

Condensate which collects in the negative pressure region of the vapor conduit system can flow by gravity into the fuel supply tank in the positive pressure region via the liquid pressure seal which, while permitting such flow, maintains the pressure differential between the two regions, which is a feature of this invention.

Obviously many variations and modifications are possible in the light of the above teachings. It is therefore intended that the scope of the present invention be determined by the appended claims.

I claim:

1. A vapor return system for collecting vapors associated with a filling operation comprising:
   a fuel delivery system including a holding tank, fuel pumping means connected at one end thereof to said holding tank for pumping liquid from said holding tank, and nozzle means connected to the other end of said pumping means adapted for connecting with the inlet of a mobile storage apparatus;
   boot means disposed around said nozzle means for sealably abutting said storage apparatus and containing the vapors therein, said boot means including an eccentrically annular magnet, an eccentrically annular ferromagnetic ring attached contiguously to one side of said annular magnet having an opening greater than the opening in said annular magnet, the respective openings in said magnet and ring cooperating to receive the free end of said boot, and a resilient sealing cover attached to the other side of said magnet;
   vapor return means connected between said boot means and said holding tank for conducting vapors from said boot means to said tank;
   independently powered vapor pumping means included in said vapor return means for providing suction in said vapor return means at said boot means; and
   a liquid seal connected between the suction side of said vapor pumping means and said holding tank for providing means for conduction of condensed vapors to said tank while maintaining a pressure differential thereacross substantially corresponding to the pressure differential across said vapor pumping means.

2. A fuel nozzle vapor return system according to claim 1, further comprising:
   said vapor pumping means including control means comprising a control valve, and response means responsive to the level of suction in said vapor return means proximate said boot means for controlling the opening of said control valve to provide a predetermined level of suction thereat.

3. A fuel nozzle vapor return system according to claim 2, wherein said control means further including:
   a pressure sensor having a diaphragm responsive to the suction pressure of said pumping means; and
   A control rod operatively connected between said diaphragm and said control valve for controlling said control valve to produce a predetermined pressure at the suction end of said pumping means.

4. A fuel nozzle vapor return system according to claim 1 wherein:
   said vapor return means further including a vapor control valve interposed between said boot and said vapor return means having a flexible sleeve convoluted to telescope along the central axis thereof connected at the outer edge thereof to said vapor return means, and a valve stem conformed to mate with the inside surface of said sleeve connected to the inner edge thereof and extending through said sleeve, a first poppet valve attached to one end of said valve stem and a second poppet valve disposed in said nozzle means for controlling liquid flow therethrough operatively connected to said valve stem for urging said first poppet valve open upon opening of said second poppet valve.

5. A fuel nozzle vapor return adaptor for use on a conventional fuel nozzle fof the type including a spout receivable in the inlet to the neck of a fuel tank and having an anchoring device thereon for anchoring the nozzle to said neck, said adaptor comprising:
   boot means loosely telescoped over said spout and having one end engageable therewith, said boot being formed with a vapor outlet;
   fastening means for fastening said one end to said spout;
   releasable sealing means carried by the free end of said boot for abutting said inlet opening to restrain said boot against entering said neck and for sealing with said opening to prevent the escape of fuel vapors, said releasable sealing means including magnetic means formed in the shape of an eccentrically annular magnet, an eccentrically annular ferromagnetic ring attached contiguously to one side of said annular magnet having an opening greater than the opening in said annular magnet, the respective openings in said magnet and ring cooperating to receive the free end of said boot, and a resilient sealing cover attached to the other side of said magnet for urging said sealing means into sealing engagement with said inlet opening;

vapor return conduit means for connection on one end with said vapor outlet and on its opposite end with a vapor collection area;

vapor control valve means operatively connected to said spout for allowing flow from said boot to said vapor return conduit means concurrent with the delivery of liquid through said spout; and pumping means included in said vapor return means for withdrawing said vapors from said boot means at a predetermined level of suction.

6. A fuel nozzle vapor return adaptor as set forth in claim 5 wherein said adaptor is adapted for use with a fuel tank including a ferromagnetic neck, and wherein:

said urging means includes magnetic means mounted adjacent said sealing means for attaching to said neck to urge said sealing means into sealing engagement therewith; and a helical spring disposed within said boot means along the inner surfaces thereof interspaced between said magnetic means and said spout.

7. A fuel nozzle vapor return adaptor as set forth in claim 6 that includes:

means operative in response to flow in said nozzle to open said vapor control valve.

8. A fuel nozzle vapor return adaptor as set forth in claim 7 that includes:

form retaining means in said boot for supporting said boot against collapse, said form retaining means including a spring disposed in a helix along the interior surfaces of said boot.

9. A fuel nozzle vapor return adaptor according to claim 5 wherein:

said annular magnet comprises a ceramic magnet, including said eccentric opening conformed to define a tapered conical surface converging on the other side thereof.

10. A fuel nozzle vapor return adaptor according to claim 5 wherein:

said vapor return conduit means including a vacuum valve disposed proximate said vapor outlet for rendering said conduit means conductive upon sensing a predetermined vacuum therein.

* * * * *